US012600097B2

(12) United States Patent
Zieverink et al.

(10) Patent No.: US 12,600,097 B2
(45) Date of Patent: Apr. 14, 2026

(54) PROCESS FOR MANUFACTURING A SHAPED OBJECT THROUGH FILAMENT WINDING

(71) Applicant: PLANTICS HOLDING B.V., Arnhem (NL)

(72) Inventors: Martinus Mathilda Pieter Zieverink, Arnhem (NL); Beer Holthuis, Arnhem (NL); Wridzer Jan Willem Bakker, Arnhem (NL)

(73) Assignee: PLANTICS HOLDING B.V., Arnhem (NL)

( * ) Notice: Subject to any disclaimer, the term of this patent is extended or adjusted under 35 U.S.C. 154(b) by 281 days.

(21) Appl. No.: 18/042,327

(22) PCT Filed: Aug. 24, 2021

(86) PCT No.: PCT/EP2021/073407
§ 371 (c)(1),
(2) Date: Feb. 21, 2023

(87) PCT Pub. No.: WO2022/043330
PCT Pub. Date: Mar. 3, 2022

(65) Prior Publication Data
US 2024/0009943 A1 Jan. 11, 2024

(30) Foreign Application Priority Data

Aug. 25, 2020 (EP) ..................................... 20192605

(51) Int. Cl.
*B32B 41/00* (2006.01)
*B29C 70/32* (2006.01)
(Continued)

(52) U.S. Cl.
CPC .............. *B29C 70/56* (2013.01); *B29C 70/32* (2013.01); *C08G 63/60* (2013.01); *C08J 5/244* (2021.05);
(Continued)

(58) Field of Classification Search
CPC ....... B29C 70/56; B29C 70/32; B29C 53/005; B29C 53/582; B29C 70/545;
(Continued)

(56) References Cited

U.S. PATENT DOCUMENTS 3,390,037 A   6/1968   Christie
4,025,407 A   5/1977   Chang et al.
(Continued)

FOREIGN PATENT DOCUMENTS

EP         2740584 A1      6/2014

OTHER PUBLICATIONS

International Search Report and Written Opinion for corresponding International application No. PCT/EP2021/073407; dated Dec. 8, 2021 (15 pages).
(Continued)

*Primary Examiner* — Michael N Orlando
*Assistant Examiner* — Joshel Rivera
(74) *Attorney, Agent, or Firm* — Mendelsohn Dunleavy, PC; Kevin J. Dunleavy

(57) ABSTRACT

The invention pertains to a process for manufacturing a shaped object through a winding process comprising the steps of —winding resin-containing fiber under tension to form a shaped fibrous object, the resin comprising at least 50 wt. % of polyester derived from an aliphatic polyol with 2-15 carbon atoms and an aliphatic polycarboxylic acid with 3 to 15 carbon atoms, calculated on the polymer constituents of the resin, —subjecting the shaped fibrous object to a curing step. In one embodiment, the resin-containing fibers
(Continued)

are provided through a process comprising the steps of —contacting fiber with a liquid resin composition, the resin composition comprising polyester derived from an aliphatic polyol with 2-15 carbon atoms and an aliphatic polycarboxylic acid with 3 to 15 carbon atoms, to obtain resin-containing fibers, —subjecting the resin-containing fibers to a drying step, the drying step being carried out until the resin-containing fibers are tacky and the resin-containing fiber has a diluent content of at most 25 wt. %, calculated on the weight of resin composition in the resin-containing fiber. Tacky fibers obtainable by this intermediate process are also claimed, as is the shaped fibrous object that can be obtained by the process according to the invention.

20 Claims, 3 Drawing Sheets

(51) Int. Cl.

| | |
|---|---|
| *B29C 70/56* | (2006.01) |
| *C08G 63/60* | (2006.01) |
| *C08J 5/24* | (2006.01) |
| *B29K 67/00* | (2006.01) |

(52) U.S. Cl.
CPC ....... *B29K 2067/00* (2013.01); *C08J 2367/04* (2013.01)

(58) Field of Classification Search
CPC ........ B29C 70/347; C08G 63/60; C08J 5/244; C08J 2367/04; B29K 2067/00; B27N 5/02

USPC .................... 156/60, 64, 350, 351, 378, 379
See application file for complete search history.

(56) References Cited

U.S. PATENT DOCUMENTS

| | | | |
|---|---|---|---|
| 5,305,601 A | 4/1994 | Drain et al. | |
| 2009/0022921 A1 | 1/2009 | Meraldi | |
| 2016/0257802 A1* | 9/2016 | Lewandowski | ......... C08L 67/00 |
| 2020/0079958 A1 | 3/2020 | Staff et al. | |

OTHER PUBLICATIONS

Office Action for corresponding Chinese application No. 2021800518254; dated Jun. 30, 2025 (18 pages). Machine Translation.
Japanese office action for corresponding application No. 2023-513263; dated Jul. 23, 2025 (5 pages). Machine Translation.

* cited by examiner

PROCESS FOR MANUFACTURING A SHAPED OBJECT THROUGH FILAMENT WINDING

FIELD OF THE INVENTION

The present invention pertains to a process for manufacturing a shaped object through filament winding.

BACKGROUND OF THE INVENTION

Filament winding processes are well known in the art. They are used in the manufacture of open or closed end structures by winding resin-impregnated filaments under tension to form a shaped fibrous object. The winding can take place over a mandrel or in a core-less winding process. In a coreless winding process, the fibers are wound over a framework which by winding under tension, provides a shaped structure. Once the object has reached its desired shape and thickness, the resin is cured, and where appropriate the mandrel is removed. Glass and carbon fibers are often used as filaments, in particular where high-strength objects are aimed for. High strength polymer fibers such as aramid fibers have also been used. A relatively new development in this field is the use of natural fibers such as flax.

The resin used in filament winding processes is often an epoxy resin, although other resins have also been used.

There is need in the art for a process for manufacturing a shaped object through filament winding which shows increased flexibility, and/or allows the manufacture of objects with a shape not directly resulting from the winding step. The present invention provides such a process.

SUMMARY OF THE INVENTION

The present invention pertains to a process for manufacturing a shaped object through a winding process comprising the steps of winding resin-containing fiber under tension to form a shaped fibrous object, the resin comprising at least 50 wt. % of polyester derived from an aliphatic polyol with 2-15 carbon atoms and an aliphatic polycarboxylic acid with 3 to 15 carbon atoms, calculated on the polymer constituents of the resin, and subjecting the shaped fibrous object to a curing step.

In the present invention, use is made of a specific resin, namely a resin comprising at least 50 wt. % of a polyester derived from an aliphatic polyol with 2-15 carbon atoms and an aliphatic polycarboxylic acid with 3 to 15 carbon atoms. It has been found that the use of this specific resin has a number of advantages, in particular due to its specific curing characteristics.

A first advantage associated with the use of this resin is that it is possible to store resin-impregnated fibers at room temperature. This makes it possible to separate the step of impregnating the fibers with the resin from the step of winding the fiber to form a shaped fibrous object. Separating the step of impregnating the fibers with the resin from the step of winding the fibers is advantageous, because the two steps may be carried out at different rates. Additionally, it has appeared that especially in the case where non-cylindrical objects are manufactured the resin uptake in a direct winding process may be inhomogeneous, as the winding rate may vary with the diameter of the object. Separating the step of impregnating the fiber with the resin from the step of winding the fiber solves this problem. Further, the step of impregnating the fiber with the resin requires different operating conditions, and possibly different associated concerns on health, safety, and environment (HSE) than the step of winding impregnated fibers. Resin-impregnated fibers for use in a filament winding process are in themselves known in the art. They are often indicated as prepregs. However, the known prepregs require storage and transport under refrigeration conditions, e.g., at temperatures below 0° C., while the present prepregs can be stored and transported under ambient conditions, both as regards temperature and humidity. This means not only that storage and transport will be less costly, because fewer measures will be required to keep the prepregs under suitable storage conditions; it also means that the prepregs are less susceptible to changes in the storage conditions.

A second advantage associated with the use of the specific resin is that the specific curing properties of this resin make it possible to effect only part of the curing on the mandrel. This makes it possible to manufacture a fibrous object with a shape which does not directly correspond to the shape resulting from the winding step in which the object is formed. More specifically, it has been found that the use of the specific resin described herein makes it possible to carry out a process comprising the steps of subjecting the shaped fibrous object to a first curing step to form a partially cured shaped fibrous object, if a mandrel is present removing the partially cured shaped fibrous object from the mandrel, subjecting the partially cured shaped fibrous object to a step in which its shape is changed, and subjecting the thus-obtained object to a further curing step.

In addition to the above-mentioned advantages, the process of the present invention results in shaped fibrous objects with good properties. Further advantages of the present invention and specific embodiments thereof will become apparent from the further specification.

The invention will be discussed in more detail below.

DETAILED DESCRIPTION

Figure 1A:
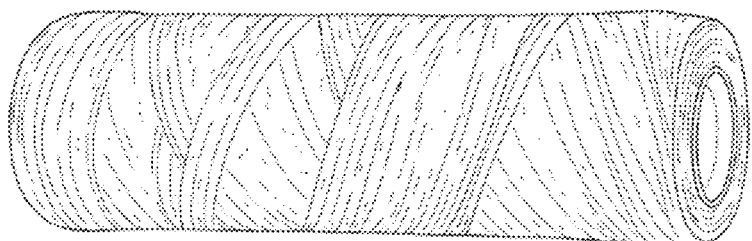
FIG. 1A and Fig. 1B show the fibrous object obtained in Example 1.

In the process of the present invention resin-containing fibers are wound under tension to form a shaped fibrous object, the resin comprising polyester derived from an aliphatic polyol with 2-15 carbon atoms and an aliphatic polycarboxylic acid with 3 to 15 carbon atoms. Resin-containing fibers are fibers in which a starting fiber (as discussed below) has been provided with the specific resin (as will be discussed below).

The fiber used in the present invention may be any fibrous material which can be wound around a mandrel. Examples include monofilament yarn and multifilament yarn, tapes, and any other longitudinal shapes which can be wound round a mandrel. Suitable fibers, which term for the present specification thus also encompass tapes, may be glass fibers, carbon fibers, polymer fibers, e.g., polyester fibers such as aramid fibers, polyalkylene fibers such as polyethylene fibers and polypropylene fibers. Natural fibers such as fibers derived from flax, hemp, palm, or other plant- or animal-based fibers may be used. Suitable fibers for use in filament winding processes are known in the art. Combinations of different types of fibers may also be applied. In one embodiment, the use of glass fibers may be preferred.

In one embodiment, layers of different types of fibers are applied. In particular, the use of natural fiber as outer layer may be attractive to provide an attractive visual appearance and/or to help is removing water from the system.

It has been found that where the fibers used are not endless fibers, but rather fibers built up from fibers with a limited length, e.g., fibers derived from natural products such as flax, hemp, or other natural fibers, the presence of the resin also contributes to the strength of the fiber as it is provided to the winding step. This applies in particular when a partial curing step has been carried out, as will be discussed in more detailed below.

The resin used in the present invention comprises polyester derived from an aliphatic polyol with 2-15 carbon atoms and an aliphatic polycarboxylic acid with 3 to 15 carbon atoms. The resin as present in the fibers comprises polymer constituents, and optionally a diluent.

Of the polymer constituents present in the resin composition, at least 50 wt. % is polyester derived from an aliphatic polyol with 2-15 carbon atoms and an aliphatic polycarboxylic acid with 3 to 15 carbon atoms, in particular at least 60 wt. %, more in particular at least 70 wt. %. More in particular, as the advantages of the present invention are associated with the nature of the resin, it may be preferred that of the polymer constituents present in the resin, at least 80 wt. % is polyester derived from an aliphatic polyol with 2-15 carbon atoms and an aliphatic polycarboxylic acid with 3 to 15 carbon atoms, in particular at least 90 wt. %, more in particular at least 95 wt. %. It is noted that in the context of the present specification the term polymer constituents also encompasses monomers which can polymerise under the conditions which the resin-containing fiber will encounter during the process according to the invention.

The resin composition comprises polyester derived from an aliphatic polyol with 2-15 carbon atoms and an aliphatic polycarboxylic acid with 3 to 15 carbon atoms.

The aliphatic polyol used in the present invention, sometimes also indicated herein as polyalcohol, comprises at least two hydroxyl groups, in particular at least three hydroxyl groups. In general, the number of hydroxyl groups will be 10 or less, more in particular 8 or less, or even 6 or less, in particular two or three. The polyalcohol has 2-15 carbon atoms. More in particular, the polyalcohol has 3-10 carbon atoms. It is preferred for the polyalcohol to contain no heteroatoms. More in particular the polyalcohol is an aliphatic polyalkanol containing only C, H, and O atoms. It is preferred for the polyalcohol to contain no non-carbon groups than hydroxyl groups. In a preferred embodiment of the present invention the polyalcohol contains a relatively large number of hydroxyl groups in comparison with its number of carbon atoms. For example, the ratio between the number of hydroxyl groups and the number of carbon atoms ranges from 1:4 (i.e. one hydroxyl group per four carbon atoms, or 8 carbon atoms for a dialcohol) to 1:1 (i.e. 1 hydroxyl groups per carbon atom). In particular, the ratio between the number of hydroxyl groups and the number of carbon atoms ranges from 1:3 to 1:1, more specifically, from 1:2 to 1:1. A group of specifically preferred polyalcohols is the group wherein the ratio ranges from 1:1.5 to 1:1. Compounds wherein the ratio of hydroxyl groups to carbon atoms is 1:1 are considered especially preferred. It is preferred for the aliphatic polyol to be saturated, i.e., not to comprise carbon-carbon double or triple bonds.

Examples of suitable polyalcohols include polyalcohols selected from glycerol, sorbitol, xylitol, mannitol, and sorbitane, and dialcohols selected from 1,2-propanediol, 1,3-propanediol, 1,2-ethanediol, butanediol, hexanediol, and isosorbide. The use of compounds selected from the group of glycerol, sorbitol, xylitol, and mannitol is preferred, with the use of glycerol being particularly preferred.

The preference for glycerol is based on the following: In the first place glycerol has a melting point of 20° C., which allows easy processing, in particular as compared to xylitol, sorbitol, and mannitol, which all have melting points well above 90° C. Further, it has been found that glycerol gives a polymer of high quality, and thus combines the use of an easily accessible source material with good processing conditions and a high-quality product. Mixtures of different types of alcohol may also be used.

It is preferred, however, for the polyalcohol to consist for at least 50 mole % of glycerol, xylitol, sorbitol, or mannitol, in particular of glycerol, preferably at least 70 mole %, more in particular at least 90 mole %, or even at least 95 mole %. In one embodiment the polyalcohol consists essentially of glycerol.

The use of glycerol which is a side product of the manufacture of biodiesel by the transesterification reaction of glycerides with mono-alcohols is a specific embodiment of the present invention. Suitable monoalcohols include C1-C10 monoalcohols, in particular C1-C5 monoalcohols, more in particular C1-C3 monoalcohols, specifically methanol. The glycerides are mono-di- and esters of glycerol and fatty acids, the fatty acids generally having 10-18 carbon atoms. Suitable processes for manufacturing biodiesel with associated glycerol are known in the art.

The aliphatic polycarboxylic acid used in the present invention comprises at least two carboxylic acid groups, in particular at least three carboxylic acid groups. In general, the number of carboxylic acid groups will be 10 or less, more in particular 8 or less, or even 6 or less. The polycarboxylic acid has 3-15 carbon atoms. More in particular, the polycarboxylic acid has 3-10 carbon atoms. It is preferred for the polycarboxylic acid to contain no N or S heteroatoms. More in particular the polycarboxylic acid is an aliphatic polycarboxylic acid containing only C, H, and O atoms. It is preferred for the aliphatic polyol to be saturated, i.e., not to comprise carbon-carbon double or triple bonds.

In one embodiment a dicarboxylic acid is used. The dicarboxylic acid, if used, may be any dicarboxylic acid which has two carboxylic acid groups and, in general, at most 15 carbon atoms. Examples of suitable dicarboxylic acids include itaconic acid, malic acid, succinic acid, glutaric acid, adipic acid, sebacic acid and oxalic acid. Itaconic acid and succinic acid may be preferred.

In one embodiment a tricarboxylic acid is used. The tricarboxylic acid, if used, may be any tricarboxylic acid which has three carboxylic acid groups and, in general, at most 15 carbon atoms. Examples include citric acid, isocitric acid, aconitic acid (both cis and trans), and 3-carboxy-cis, cis-muconic acid. The use of citric acid is considered preferred, both for reasons of costs and of availability. Where applicable the polycarboxylic acid may be provided as a whole or in part in the form of an anhydride, e.g., citric acid anhydride.

It has been found that the use of tricarboxylic acid results in a polyester with attractive properties. Therefore, in one embodiment, the polyacid comprises at least 10 wt. % of tricarboxylic acid, whether or not in combination with dicarboxylic acids, other tricarboxylic acids, and mixtures thereof. In one embodiment the polyacid comprises at least 30 wt. % of tricarboxylic acid, calculated on the total amount of polyacid, preferably at least 50 wt. %. In one embodiment the amount of tricarboxylic acid is at least 70 wt. %, more in particular at least 90 wt. %, or even at least 95 wt. %. In one embodiment the polyacid consists essentially of tricarboxylic acid, wherein the word essentially means that other acids may be present in amounts that do not affect the properties of the material.

In another embodiment of the invention the acid comprises at least 10 wt. % of dicarboxylic acid, calculated on the total amount of acid, preferably at least 30 wt. %, more preferably at least 50 wt. %. In one embodiment the amount of dicarboxylic acid is at least 70 wt. %. In one embodiment the acid comprises a combination of at least 10 wt. % of tricarboxylic acid and at least 2 wt. % of dicarboxylic acid, more in particular at least 10 wt. % of tricarboxylic acid and at least 5 wt. % of dicarboxylic acid, or at least 10 wt. % of tricarboxylic acid and at least 10 wt. % of dicarboxylic acid. In this embodiment the weight ratio between the two types of acid may vary within wide ranges, depending on the properties of the desired material. In one embodiment, the dicarboxylic acid makes up between 2 and 90 wt. % of the total of dicarboxylic and tricarboxylic acid, in particular between 5 and 90 wt. %, more in particular between 10 and 90 wt. %, depending on the properties of the desired material. It is noted that the preferred ranges for the tricarboxylic acid specified above are also applicable to this embodiment. It has been found that the use of a tricarboxylic acid, in particular citric acid, results in the formation of a high-quality composite material, in particular in combination with the use of a trialcohol such as glycerol.

The combination of a tri-acid with a tri-alcohol is considered particularly preferred, as it has been found to result in high-strength polymer materials. In one embodiment, at least 50 wt. % of the polyalcohol is trialcohol, in particular glycerol, more in particular at least 70 wt. %, still more in particular at least 90 wt. %, while at least 50 wt. % of the of the polycarboxylic acid is triacarboxylic acid, in particular citric acid, more in particular at least 70 wt. %, still more in particular at least 90 wt. %.

The molar ratio between the polyalcohol and the polyacid will be governed by the ratio between the number of reacting groups in the alcohol(s) and acid(s) used. In general, the ratio between the number of OH groups and the number of acid groups is between 5:1 and 1:5. More in particular, the ratio may between 2:1 and 1:2, more specifically between 1.5:1 and 1:1.5, more preferably between 1.1:1 and 1:1.1. The theoretical molar ratio is 1:1.

The polyester is formed by combining the alcohol and the acid to form a liquid phase. Depending on the nature of the compounds this can be done, e.g., by heating a mixture of components to a temperature where the acid will dissolve in the alcohol, in particular in glycerol. Depending on the nature of the compounds this may be, e.g., at a temperature in the range of 20-250° C., e.g., 40-200° C., e.g. 60-200° C., or 90-200° C. In one embodiment, the mixture may be heated and mixed for a period of 5 minutes to 2 hours, more specifically 10 minutes to 45 minutes, at a temperature of 100-200° C., in particular 100-150° C., more in particular at a temperature in the range of 100-140° C.

Optionally a suitable catalyst can be used for the preparation of the polyester. Suitable catalysts for the manufacture of polyester are known in the art. Preferred catalysts are those that do not contain heavy metals. Useful catalysts are strong acids like, but not limited to, hydrochloric acid, hydroiodic acid (also indicated as hydriodic acid) and hydrobromic acid, sulfuric acid ($H_2SO_4$), nitric acid ($HNO_3$), chloric acid ($HClO_3$), boric acid, perchloric acid ($HClO_4$) trifluoroacetic acid, p-toluenesulphonic acid, and trifluoromethanesulfonic acid. Catalysts like Zn-acetate and Mn-acetate can also be used, although they may be less preferred.

The resin composition as it is present in the resin-containing fibers may or may not contain a diluent. A suitable diluent, is present, needs to meet a number of requirements: it is a liquid with a low viscosity. It has no or low reactivity with the polyol and the carboxylic acid. It should be a good solvent for the polyol and the carboxylic acid. It should easily evaporate from the resin-containing fiber.

While other liquids are possible, the use of water is considered preferred for technical, economical, and environmental reasons. Accordingly, the diluent, if present, generally consists for at least 50 wt. % of water, in particular at least 70 wt. %, more in particular at least 90 wt. %, even more in particular at least 95 wt. %.

It is an advantage of the present invention that, as compared to resins conventionally used in filament winding, the resin as presently used herein can be free from diluent, or can rely on water as diluent. This obviates the necessity of the measures required when dealing with resins based on volatile organic solvents such as acetone.

The diluent, if present in the resin composition as it is present in the resin-containing fiber as it is provided to the winding step, will generally be present in an amount of at most 90 wt. %, in particular at most 70 wt. %, calculated on the resin composition. While the presence of some diluent may be inherent due to its presence in the composition as it is applied onto the fiber, or advantageous, as it may keep the fiber flexible, the presence of too large amounts of diluent does not bring additional advantages, while it still has to be removed from the composition. Accordingly, it may be preferred for the resin composition in the resin-containing fiber as it is provided to the winding step to contain at most 50 wt. % of diluent, in particular at most 40 wt. % of diluent.

In one embodiment, the diluent content of the resin composition as it is present in the resin-containing fiber as it is provided to the winding step is at most 20 wt. %, in particular at most 15 w. %, more in particular at most 10 wt. %. This may in particular be the case where the fiber provided to the winding step is a prepreg that has been prepared separately. However, it may also be the case in a direct winding process, e.g., where a drying step is carried out between the application of the resin onto the fiber and the provision of the resin-containing fiber to the winding step or where the resin as applied to the fiber has a low diluent content. It may be preferred for the resin composition as it is present in the resin-containing fiber provided to the filament winding step to contain some diluent, as this may lead to a more flexible fiber. This may in particular, but not only, be the case at higher resin contents and/or at higher extents of polymerization. Therefore, in one embodiment, the resin composition as it is present in the resin-containing fiber provided to the filament winding step contains at least 0.5 wt. % of water, in particular at least 1 wt. % of water.

The resin composition may contain further components.

In one embodiment compounds are added to increase the interaction of the polymer with hydrophobic materials, or to increase the water resistance of the final product. Suitable compounds include for example, C5 to C22 saturated or unsaturated fatty acids or salts thereof, C5 to C22 saturated or unsaturated fatty alcohols, and dimeric and trimeric fatty acids or alcohols. For example, glycerol monostearate, triethyl citrate, and valeric acid can be used in this invention.

The compounds to increase hydrophobicity will generally be applied in an amount of 0.1-5 wt. %, calculated on the amount of the polymer, more in particular in an amount of 0.3-3 wt. %. Further components to achieve this purpose include saturated fatty acid mixtures obtained from the full hydrogenation of vegetable oils, or vegetable oils in general.

In general, the resin-containing fiber provided to the winding step contains between 1 and 90 vol. % of resin composition, calculated on the total volume of the resin-containing fiber. The presence of too little resin will result in a shaped object with insufficient properties. The presence of very high amounts of resin may detract from the properties of the shaped object in the case that the fibers are intended to provide specific properties to the shaped object. In one embodiment, it may be preferred for the resin-containing fiber to be provided to the winding step to contain 1-25 vol. % of resin composition, in particular 1-20 vol. %, more in particular 1-15 vol. %. In some embodiments 1-10 vol. %. In another embodiment, it may be preferred for the resin-containing fiber to contain at most 80 vol. % of resin composition, in particular at most 70 vol. % of resin composition. In one embodiment it is preferred for the resin-containing fiber to contain 25-90 vol. % of resin composition, in particular 25-80 vol. %, more in particular 25-70 vol. %.

The amount of resin composition on the fiber as it is provided to the winding step in vol. % is calculated from the weight of the resin composition on the fiber, the density of the resin composition, and the density of the material from which the fiber is built up (glass, flax, etc.)

The polyester present in the resin-containing fiber provided to the winding step generally has an extent of polymerization, which is the ratio of the fraction of functional groups that have reacted to the maximum of those functional groups that can react in the range of 0.05 to 0.6. The extent of polymerization can be determined by way of the acid value or gravimetrically. The desired extent of polymerization will depend on a number of factors. On the one hand, a higher extent of polymerization at the stage where the fiber is provided to the winding step has the advantage that less curing further on in the process is required. On the other hand, a higher extent of polymerization may make for a more viscous resin composition which may detrimentally affect the coating process. It may be preferred for the extent of polymerization of the resin on the fiber as it is provided to the winding step to be at least 0.1, in particular at least 0.2, more in particular at least 0.3.

In one embodiment, the resin-containing fiber is obtained by contacting fiber with a liquid resin composition as discussed above. The contacting step should be such that the resin composition adheres to the fiber. In one embodiment this is done by passing the fiber through a resin bath. In another embodiment, fiber is contacted with a lick roll provided with the resin. If so desired, excess resin can be removed from the fiber. Other manners known in the art for coating fibers with liquid compositions may also be applied. It is possible to apply the liquid resin composition in a single step, but also in two or more steps, whether or not with intermediate drying.

The viscosity of the liquid composition should be such that adequate coating of the fiber within a reasonable time frame is achieved. To this end, the viscosity should neither be so low that no meaningful coating is achieved, nor so high that coating of the fiber will be slow. The viscosity will depend on a number of features, including the temperature of the liquid composition, with a higher temperature making for a lower viscosity, the extent of polymerization of the polyester, with a higher extent of polymerization making for a higher viscosity, and the presence if any, of a diluent, with a higher amount of diluent making for a lower viscosity. Taking the above into account, it is within the scope of the skilled person to prepare a liquid resin composition having an appropriate viscosity.

In one embodiment of the present invention, the resin-containing fiber is provided through a process comprising the steps of contacting fiber with a liquid resin composition, the resin composition comprising at least 50 wt. % of polyester derived from an aliphatic polyol with 2-15 carbon atoms and an aliphatic polycarboxylic acid with 3 to 15 carbon atoms, calculated on the polymer constituents of the resin, to obtain resin-containing fibers, subjecting the resin-containing fibers to a drying step, the drying step being carried out until the resin-containing fiber are tacky and the resin-containing fiber has a diluent content of at most 25 wt. %, calculated on the weight of resin composition in the resin-containing fiber. It may be preferred for the resin-containing fiber to have a diluent content of at most 20%, more in particular at most 15%, still more in particular at most 10%, even more in particular at most 8 wt. %, in some embodiments at most 5 wt. %.

In the context of the present specification, tackiness is tested as follows: a length of 10 cm of resin-containing fiber as it will be provided to the winding step is placed flat on a clean and dry horizontal glass plate. A pressure of 200 g per mm fiber width (determined on the fiber before rolling) is applied using a roller for 5 seconds. If necessary, the roller may be provided with a non-stick layer to prevent adherence of the fiber to the roller rather than to the glass plate. Then, the plate is lifted and turned over so that the resin-containing fiber faces downwards. If the resin-containing fiber drops from the glass plate within 15 seconds, the resin-containing fiber is regarded as not tacky in the context of the present specification. The test is carried out at 20° C. and a relative humidity between 40 and 60%.

In this embodiment, the tacky resin-containing fiber with the specified diluent content can be stored before being used in a filament winding step. It can also be transported. An advantage of this so-called resin prepreg in comparison with known prepregs for filament winding is that this prepreg can be stored under ambient conditions, e.g. at a temperature of 4-35° C. and a humidity of 10-90%, for a period of at least 4 hours, in particular at least 24 hours, while still remaining tacky. The tackiness of the polymer is a measure for the extent of polymerisation of the polyester. If the resin-containing fibers are no longer tacky, the polymer will have polymerised to such an extent that when the fibers are would round a mandrel further curing will not cause the fibers to adhere to each other to form a shaped object which sufficiently holds its shape.

In a preferred embodiment, said tacky resin-containing fiber is wound round a spool to form spooled tacky resin-containing fibers. Spools of tacky resin-containing fiber are easy to store, transport, and process further. The tacky resin-containing fiber is provided to the mandrel, where necessary after unspooling.

The invention also pertains to the prepreg itself. More in particular, the invention pertains to a resin-containing fiber wherein the resin fiber containing 1-25 vol. % of a resin comprising at least 50 wt. % of polyester derived from an aliphatic polyol with 2-15 carbon atoms and an aliphatic polycarboxylic acid with 3 to 15 carbon atoms, calculated on the polymer constituents of the resin, the resin-containing fiber being tacky, and having a diluent content of at most 25 wt. %, calculated on the weight of resin composition in the resin-containing fiber. In one embodiment, the fiber is in a spool. The preferences described above for the nature and amount of the resin and the fiber, and further preferences, also apply to this aspect of the invention.

In another embodiment, the resin-containing fibers are processed directly without formation of a separate prepreg. In this embodiment the resin-containing fiber is provided through a process comprising the step of contacting fiber with a liquid resin composition, the resin composition comprising at least 50 wt. % of polyester derived from an aliphatic polyol with 2-15 carbon atoms and an aliphatic polycarboxylic acid with 3 to 15 carbon atoms, calculated on the polymer constituents of the resin, to obtain resin-containing fibers, followed by providing the fibers thus obtained to the winding step.

Whether working with a prepreg, or directly processing resin-containing fiber, the process of the present invention encompasses a step in which a resin-containing fiber is wound under tension to form a shaped fibrous object (also indicated herein as the winding step). As indicated above, and as is well known in the art, the winding can take place around a mandrel, or it can take place around a framework in a coreless filament winding step. This step is well known in field of filament winding processes and requires no further elucidation. Suitable winding patterns are also known in the art, and include hoop-like winding patterns, helical winding patterns, random winding patterns, etc.

The shaped fibrous object resulting from the winding step is then subjected to a curing step.

If so desired the shaped fibrous object can be subjected to a drying step before the curing step, to remove excess diluent. If a prepreg is used, a drying step will generally not be required. It may be attractive if resin-containing fibers are used which contain substantial amounts of diluent. A drying step, if carried out, can take place at a temperature between, e.g., 15° C. and 200° C. (air temperature), in particular at a temperature of 15-100° C. Depending on the temperature it can be carried out, for a few minutes, e.g., at least 2 minutes, in particular at least 5 minutes, but also for longer periods, e.g., for 0.25 hours to 3 days, depending on the size and shape of the object, and the amount of water in the shaped object. It is within the scope of a person skilled in the art to select suitable drying conditions. The application of vacuum, or the provision of air flow, to increase evaporation of the diluent may be considered.

The curing step is intended to further polymerise the polyester. The crux of the curing step is that the polyester is at reaction temperature, e.g., a product temperature of 80-250° C., in particular 100-200° C. Curing can be carried out using heating technology known in the art, e.g., in in an oven with an oven temperature from 80° C. up to 450° C. Different types of ovens may be used, including but not limited to belt ovens, convection ovens, microwave ovens, infra-red ovens, hot-air ovens, conventional baking ovens and combinations thereof. Curing can be done in a single step, or in multiple steps. To provide controlled curing it may be preferred to increase the product temperature during curing. The curing times range from 5 seconds up to 24 hours, depending on the size and shape of the object and on the type of oven and temperature used, in particular 5 minutes to 12 hours. It is within the scope of a person skilled in the art to select suitable curing conditions. The resin composition used in the process according to the invention is thus a heat-curing resin composition. No further curing steps by ionizing or actinic radiation are carried out.

Depending on the nature of the object that is manufactured, the cured shaped fibrous object may or may not be removed from the mandrel. Filament winding is often used to provide fiber reinforcement to objects, e.g., pressure vessels. In this case, the cured shaped fibrous object will not be removed from the mandrel. Rather, the cured shaped fibrous object and the mandrel will form a single object. In other embodiments, the cured shaped fibrous object is removed from the mandrel.

In one embodiment, the curing step is carried out in a multiple step process, comprising the steps of subjecting the shaped fibrous object to a first curing step to form a partially cured shaped fibrous object, where a mandrel is present, removing the partially cured shaped fibrous object from the mandrel, subjecting the partially cured shaped fibrous object to a further curing step.

A first advantage of this sequence is that the removal of the mandrel, if present, may make it easier for hot air to circulate through the shaped fibrous object, which may increase the curing rate.

In this process, the polymer in the partially cured shaped fibrous object generally has an extent of polymerization of at least 0.4 in particular at least 0.5. A minimum extent of polymerization is generally required to ensure that the shaped fibrous object does not disintegrate into separate fibers. For the same reason, the partially cured shaped fibrous object generally has a diluent content of at most 2 wt. %, more in particular at most 1 wt. %, calculated on the total weight of the partially cured shaped fibrous object.

In general, the partially cured fibrous object has an extent of polymerization of at most 0.8, in particular at most 0.7, with further curing being effected in the further curing step.

After the partially cured fibrous object has been removed from the mandrel, it can be subjected to a further curing step, under the curing conditions as specified above.

In one embodiment, the partially cured object is subjected to a step in which its shape is changed. The partially cured object can still be relatively flexible, and it is therefore possible to bring it into a shape which is otherwise not possible to achieve using filament winding processes. Examples of methods through which the shape of an object is changed include cutting, pressing, moulding, vacuum forming, etc. After the change in shape, the object can be cured as described above.

For coreless filament winding processes, effecting the curing in a two-step process may also be attractive, in particular where a shape-changing step is carried out between the first curing step and the second curing step.

As will be evident to the skilled person, the curing step entails the formation of an ester through reaction of the alcohol with the carboxylic acid, with the formation of water as side product. This water has to be removed from the shaped fibrous object. It has been found that especially cases where the fibers have a limited absorption capacity for water, e.g., in the case of glass fibers, carbon fibers, or polymer-based fibers such as polyamide fibers and/or where the filament-wound layer is relatively thick, it may be attractive to take measures to ensure that the water formed in the curing step can easily evaporate. Various examples of such measures may be mentioned. In one embodiment the mandrel is porous, e.g., due to the presence of holes or the mandrel being ribbed, to allow water to evaporate. In another embodiment a water-absorbing material is provided on the mandrel, e.g., a layer of paper or cardboard, woven or non-woven textile, or other absorbing material. In a further embodiment, the mandrel itself may be of a water-absorbing material, e.g., cardboard. Selecting a relatively open winding pattern can also help to ensure adequate water removal. Curing at subatmospheric pressure, which promotes water evaporation may also be applied.

The use of fiber combinations may also be attractive, e.g., by combining a synthetic fiber, such as a glass fiber or carbon fiber, which generally have a low water absorption capacity, with a natural fiber, e.g., a cellulose-based fiber, which generally has a higher water absorption capacity. The natural fiber can then operate as a water conduit. In this embodiment, the natural fibers are generally present in an amount of 1-40 wt. %, calculated on total fiber weight, in particular in the range of 1-25 wt. %, more in particular in the range of 1-10 wt. %. The amount of natural fiber should not be too high, as this may detract from the properties of the object to be manufactured from the synthetic fiber. The natural and synthetic fibers may be combined as desired. In one embodiment, the natural fibers and synthetic fibers are applied together in a single layer. In another embodiment, one or more layers of natural fibers are combined with one or more layers of synthetic fibers. It may be preferred to use a layer of natural fibers on the outside of the object to help with water removal. It is of course also possible to mixed fiber layers with layers containing only natural fibers or only synthetic fibers.

The invention also pertains to a shaped fibrous object comprising wound resin-containing fibers, wherein the resin comprises at least 50 wt. % of polyester derived from an aliphatic polyol with 2-15 carbon atoms and an aliphatic polycarboxylic acid with 3 to 15 carbon atoms, calculated on the polymer constituents of the resin, the polyester having an extent of polymerization, which is the ratio of the fraction of functional groups that have reacted to the maximum of those functional groups that can react, of at least 0.8. Depending on the intended use, it may be preferred for the polyester to have an extent of polymerization of at least 0.9, in particular at least 0.95.

The preferences for the nature and amount of resin, types of fibers, and other preferences also apply to the present embodiment.

The objects of the present invention find application in many fields, ranging from high durability applications such as lantern poles and windmill parts, to design applications including furniture.

In one embodiment, the fibers are glass fibers, provided with a resin based on glycerol and citric acid. Especially where this resin has been polymerised to an extent of polymerisation of at least 0.9, it has been found that durable objects can be obtained. The preferences expressed above also apply to this embodiment, except when they are mutually exclusive.

In one embodiment, the fibers are natural fibers, in particular flax or hemp fibers, provided with a resin based on glycerol and citric acid. It has been found that objects based on this combination have an attractive look and feel, which makes them particularly attractive for design applications. The preferences expressed above also apply to this embodiment, except when they are mutually exclusive.

The invention will be elucidated by way of the following examples, without being limited thereto or thereby.

EXAMPLE 1: GLASS FIBER—DIRECT WINDING

A resin composition was provided comprising polyester based on glycerol and citric acid, with an extent of polymerisation of about 0.4 (based on mass balance) and a water content of 21 wt. %. The bath was at a temperature of 54° C. Glass fiber with a linear weight of 2400 tex was passed through the resin bath and excess resin was removed. The resin-containing fiber thus formed contained about 50 vol. % of resin.

The resin-containing fiber was wound round a steel pipe with a diameter of 100 mm.

The steel pipe had been coated with a release agent. Release paper may also be used, as may be release coatings such as Teflon coatings.

The winding took place at constant rpm of 5.5 rpm and a constant angle of almost 90° in a hooplike pattern. When the winding step was completed, the mandrel provided with the fibrous object was cured for 1 hour at 120° C., 1 hour at 140° C., and 2 hours at 160° C. Then, the fibrous object was cooled and removed from the mandrel.

Figure 1B:
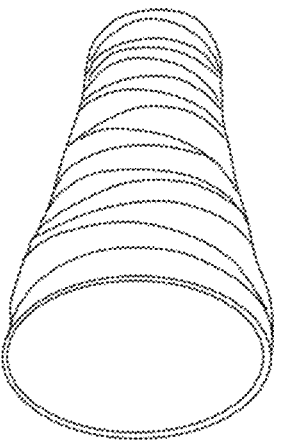

The final object contained 43 vol. % resin based on the total volume of the object consisting of resin and fiber. Pictures of the fibrous object thus obtained are in FIGS. 1a and 1b.

EXAMPLE 2: GLASS FIBER—PREPREG

A resin composition was provided as described in Example 1 The resin bath was at room temperature. Glass fiber was passed through the resin bath. Excess resin was removed. The fiber contained 50 vol. % of resin.

The resin-containing fiber was passed through an air tunnel. The residence time was four minutes. The temperature of the air was between 135 and 150° C. The resulting product was tacky. It had a water content of less than 10 wt. %. The extent of polymerisation of the resin in the thus-formed prepreg was fractionally higher than the extent of polymerisation of the resin in the polymer bath.

Figure 2:
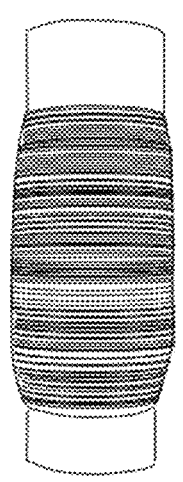
FIG. 2 shows the prepreg obtained in Example 2.

The prepreg thus obtained was stored for four days under ambient conditions (temperature 18-22° C., relative humidity 40-60%. After 4 days, the prepreg was still tacky, and otherwise unchanged. Similar materials have been stored for several weeks under these conditions without detrimental effects. The prepreg can be seen in FIG. 2.

The prepreg was used to manufacture a cylinder by winding it around a mandrel, in this case a carbon tube. After winding, a curing step was carried out by placing the mandrel with the fiber into an oven for 4.5 hours while slowly increasing the temperature from 80° C. to 180° C. After 4.5 hours, the mandrel with the shaped fibrous object was removed from the oven and the object was removed from the mandrel. The resin in the shaped fibrous object had an extent of polymerisation of above 0.95.

EXAMPLE 3-FLAX FIBER—DIRECT WINDING

A resin composition was provided comprising polyester based on glycerol and citric acid, with an extent of polymerisation of about 0.4 (based on mass balance) and a water content of 21 wt. %. The bath was at a temperature of 54° C. Flax fiber with a linear weight of 1000 tex was passed through the resin bath and excess resin was removed. The resin-containing fiber thus formed contained 60 vol. % of resin.

The resin-containing fiber was wound round a steel pipe. The winding took place at constant rpm of 5.5 rpm and constant angle.

When the winding step was completed, the mandrel provided with the fibrous object was cured for 30 minutes at 160° C., followed by 60 minutes at 180° C. Then, the fibrous object was removed from the mandrel. The final object contained 47 vol % of resin.

Figure 3A:
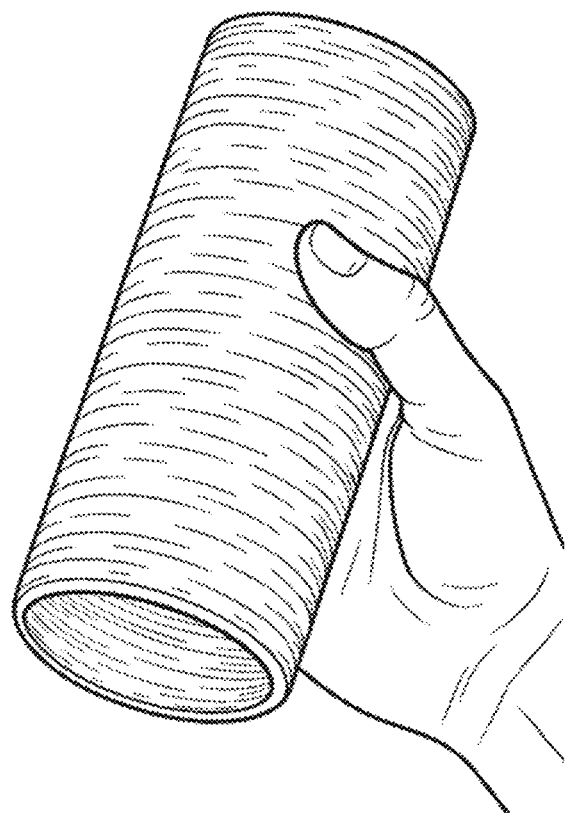
FIG. 3A and FIG. 3B show the objects formed in, respectively, 3.1 and 3.3 in Example 3.
Figure 3B:
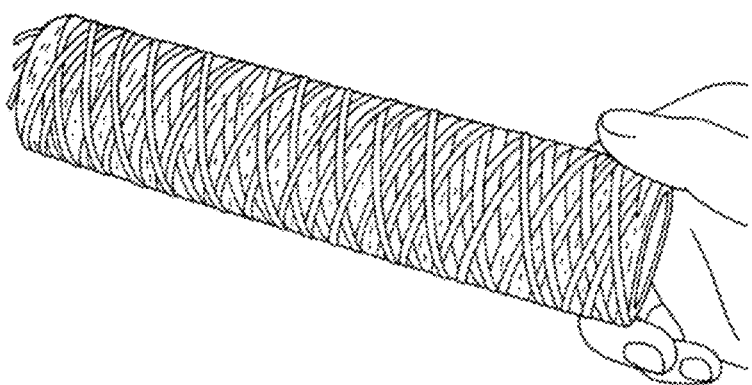

The following table gives the process conditions and results for various experiments. Pictures of the objects formed in 3.1 and 3.3 are in FIGS. 3a and 3b respectively.

|  | 3.1 | 3.2 | 3.3 |
|---|---|---|---|
| pattern | hoops at an angle of about 90° | hoops at an angle of about 90° | helix |
| mandrel diameter | 10 cm | 10 cm | 5 cm |
| number of fiber layers | 2 | 4 | 2 |
| thickness of the final object | 2 mm | 3.3 mm | 2.5 mm |

The material is lightweight and has an attractive natural look and feel.

EXAMPLE 4: EFFECT OF CURING TEMPERATURE

The procedure of Example 1 was repeated, with the following differences:

temperature of the resin bath was 47° C.
winding took place until three double layers of fiber were formed.
the mandrel had a diameter of 5 cm.

Curing took place in as follows: 1 hour at 120° C., 1 hour at 140° C., 1 hour at 160° C., and 1 hour at 180° C. The final object contained 45 vol. % resin.

To investigate the effect of curing temperature, the object formed was divided into pieces with a length of 4 cm. Four of which were submitted to further curing at 200° C. for 1 hour. It was found that the post-cured pieces showed a higher stiffness than the pieces not subjected to the post-curing step.

EXAMPLE 5: ABSORBING MANDREL, LAYERED SYSTEM

A cardboard tube with an outer diameter of 75 mm and a wall thickness of 2 mm was used as mandrel. The purpose of the mandrel was to provide an inexpensive core which at the same time contributes to water removal from the wound composite.

A resin composition was provided comprising polyester based on glycerol and citric acid, with an extent of polymerisation of about 0.4 (based on mass balance) and a water content of 20 wt. %. The bath was at a temperature of 50° C. Glass fiber with a linear weight of 2400 tex was passed through the resin bath and excess resin was removed. The glass fiber was wound around the cardboard mandrel at constant rpm of 5.5 rpm and a constant angle of almost 90° in a hooplike pattern, until a layer thickness of 8 mm was reached.

Flax fibers with a linear weight of 2400 tex were passed through the same resin bath and used to provide a single-layer top layer onto the glass fiber layer.

Figure 4:
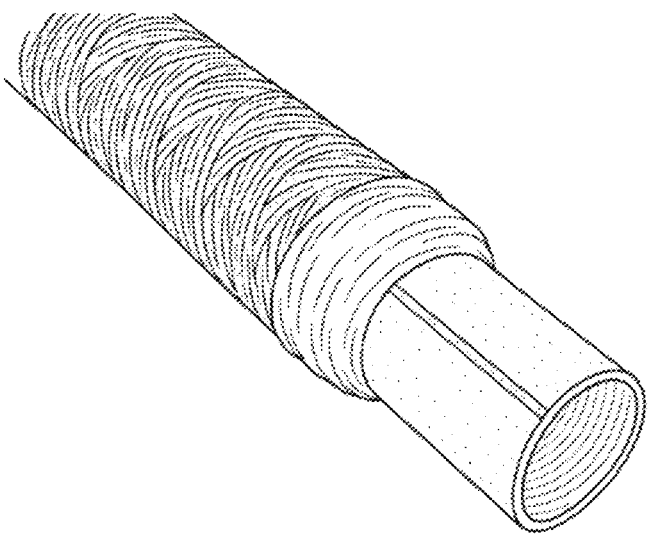
FIG. 4 shows the final fibrous object obtained in Example 5.

When the winding step was completed, the mandrel provided with the fibrous object was cured for 1 hour at 120° C., 1 hour at 140° C., 1 hour at 160° C., and 1 hour at 180° C. A picture of the final fibrous object is provided in FIG. 4. The use of a flax outer layer on a glassfiber core makes it possible to provide a product with an attractive visual appearance over a low-cost high strength glass fiber core. Additionally, the flax fiber may help to transport water from the glass fiber core.

The invention claimed is:

1. A process for manufacturing a cured shaped object through a winding process comprising steps of
   winding resin-containing fibers under tension to form a shaped fibrous object, the resin comprising at least 70 wt. % of polyester derived from an aliphatic polyol with 2-15 carbon atoms or a mixture of aliphatic polyols with 2-15 carbon atoms and an aliphatic polycarboxylic acid with 3 to 15 carbon atoms or a mixture of aliphatic polycarboxylic acids with 3-15 carbon atoms, calculated based on polymer constituents of the resin, and
   curing the shaped fibrous object to provide the cured shaped object.

2. The process according to claim 1, wherein the resin-containing fibers are provided through a process comprising steps of
   contacting fiber with a liquid resin composition, the liquid resin composition comprising a resin comprising at least 70 wt. % of the polyester derived from an aliphatic polyol polyester derived from the aliphatic polyol with 2-15 carbon atoms or the mixture of aliphatic polyols with 2-15 carbon atoms and the aliphatic polycarboxylic acid with 3 to 15 carbon atoms or the mixture of aliphatic polycarboxylic acids with 3-15 carbon atoms, to obtain the resin-containing fibers, and
   drying the resin-containing fibers until the resin-containing fibers are tacky and the resin-containing fibers have a diluent content of at most 25 wt. %, calculated based on a weight of resin composition in the resin-containing fibers.

3. The process according to claim 2, wherein the tacky resin-containing fibers are wound around a spool to form spooled tacky resin-containing fibers.

4. The process according to claim 3, wherein the tacky resin-containing fibers are provided to the step of winding the resin-containing fibers to form the shaped fibrous object, where necessary after unspooling.

5. The process according to claim 1, wherein the resin-containing fibers are provided to the winding step through a process comprising steps of
   contacting fibers with a resin composition, the resin composition comprising a resin comprising at least 70 wt. % of the polyester derived from the aliphatic polyol with 2-15 carbon atoms or a mixture of aliphatic polyols with 2-15 carbon atoms and the aliphatic polycarboxylic acid with 3 to 15 carbon atoms or a mixture of aliphatic polycarboxylic acids with 3-15 carbon atoms, to obtain the resin-containing fibers.

6. The process according to claim 5, wherein the shaped fibrous object formed during the winding step is subjected to a drying step before the curing step.

7. The process according to claim 1, wherein the step of winding the resin-containing fiber under tension to form the shaped fibrous object takes place by winding on a mandrel.

8. The process according to claim 7, further comprising a step of removing the cured shaped object from the mandrel.

9. The process according to claim 7, wherein the curing step comprises steps of
   partially curing the shaped fibrous object on the mandrel to form a partially cured shaped fibrous object,
   removing the partially cured shaped fibrous object from the mandrel, and further curing the partially cured shaped fibrous object after removing it from the mandrel.

10. The process according to claim 9, wherein after removing the partially cured shaped fibrous object from the mandrel and before the further curing step, changing a shape of the partially cured shaped fibrous object.

11. The process according to claim 1, wherein the winding step takes place on a framework as a coreless filament winding step.

12. The process according to claim 11, wherein the curing step comprises steps of partially curing the shaped fibrous object to form a partially cured shaped fibrous object, changing a shape of the partially cured shaped fibrous object, and further curing the partially cured shaped fibrous object from the changing step.

13. Resin-containing fibers comprising a resin composition comprising a resin comprising at least 70 wt. % of polyester derived from an aliphatic polyol with 2-15 carbon atoms or a mixture of aliphatic polyols with 2-15 carbon atoms and an aliphatic polycarboxylic acid with 3 to 15 carbon atoms or a mixture of aliphatic polycarboxylic acids with 3-15 carbon atoms, the fibers being tacky and having a diluent content of at most 25 wt. %, calculated based on a weight of the resin composition in the resin-containing fibers.

14. The resin-containing fibers according to claim 13, located on a spool.

15. A shaped fibrous object comprising wound resin-containing fibers, wherein the resin of the resin-containing fibers comprises at least 70 wt. % of a polyester derived from an aliphatic polyol with 2-15 carbon atoms or a mixture of aliphatic polyols with 2-15 carbon atoms and an aliphatic polycarboxylic acid with 3 to 15 carbon atoms or a mixture of aliphatic polycarboxylic acids with 3-15 carbon atoms, the polyester having an extent of polymerization, which is a ratio of a fraction of functional groups that have reacted to a maximum of those functional groups that can react, of at least 0.8.

16. The process according to claim 2, wherein the tacky resin-containing fibers are provided to the step of winding the resin-containing fibers to form the shaped fibrous object.

17. The process according to claim 6, wherein the step of winding the resin-containing fiber under tension to form the shaped fibrous object takes place by winding on a mandrel.

18. The process according to claim 6, wherein the winding step takes place on a framework as a coreless filament winding step.

19. The resin-containing fibers as claimed in claim 13, wherein the diluent content is at most 15 wt. %, calculated based on a weight of the resin composition in the resin-containing fibers.

20. The resin-containing fibers as claimed in claim 13, wherein the diluent content is at most 8 wt. %, calculated based on a weight of the resin composition in the resin-containing fibers.

* * * * *